United States Patent [19]

Yoshida et al.

[11] 4,394,662

[45] Jul. 19, 1983

[54] DOT PRINTER FOR REPRODUCTION OF HALFTONE IMAGES

[75] Inventors: Kunio Yoshida; Hiroaki Kotera; Yukifumi Tsuda, all of Kawasaki; Yoshimitsu Kanno, Sagamihara; Motohiko Naka, Kanagawa, all of Japan

[73] Assignee: Matsushita Research Institute Tokyo, Inc., Kanagawa, Japan

[21] Appl. No.: 288,513

[22] Filed: Jul. 30, 1981

[30] Foreign Application Priority Data

Jul. 31, 1980 [JP] Japan ............................ 55-106081
Dec. 25, 1980 [JP] Japan ............................ 55-188015

[51] Int. Cl.³ .................... G01D 9/00; G01D 15/18; H04N 1/22
[52] U.S. Cl. ............................ 346/33 R; 346/140 R; 346/160; 358/298
[58] Field of Search ................ 346/75, 33 R, 140 IJ, 346/140 PD, 160; 358/298

[56] References Cited

U.S. PATENT DOCUMENTS

| 3,828,357 | 8/1974 | Koeblitz | 346/140 PD |
| 3,977,007 | 8/1976 | Berry et al. | 346/1.1 |
| 4,052,715 | 10/1977 | Streifer | 346/160 |
| 4,071,849 | 1/1978 | Koyano et al. | 346/1.1 |
| 4,086,600 | 4/1978 | McClure et al. | 346/1.1 |
| 4,189,754 | 2/1980 | Gamblin | 358/298 |
| 4,314,261 | 2/1982 | Martinage | 358/298 X |

FOREIGN PATENT DOCUMENTS

3014884 6/1980 Fed. Rep. of Germany ...... 358/298

*Primary Examiner*—George H. Miller, Jr.
*Attorney, Agent, or Firm*—Lowe, King, Price & Becker

[57] ABSTRACT

To overcome the tendency of the recording head of a dot printer to become inoperative in a range below a threshold level, a gray scale input signal is modulated with an oscillating signal so that the modulated signal oscillates above and below the threshold level to reproduce halftone values below the otherwise inoperative range.

21 Claims, 21 Drawing Figures

DOT PRINTER FOR REPRODUCTION OF HALFTONE IMAGES

BACKGROUND OF THE INVENTION

The present invention relates to dot printers for reproducing halftone images, and in particular to a dot printer which overcomes the failure in reproducing halftone values below the threshold of a recording head.

Conventional recording heads employed in dot printers or the like have a threshold level below which they are not operable to produce a dot. The lack of such halftone values is detrimental to the faithful reproduction of the original.

In a prior art attempt a picture element is represented by dots of varying numbers depending on the amplitude of gray scale input to operate the recording head in a range above the threshold level. Another prior attempt involves inhibiting the recording head periodically when an input signal is below its threshold so that the average value of the optical densities of the reproduced image over a certain number of dots approximates the average value of the original densities over the corresponding period.

However, the prior art attempts have not met with wide reception because the picture quality falls short of the ideal.

SUMMARY OF THE INVENTION

The present invention obviates this problem by modulating the amplitude of a gray scale input signal prior to application to the recording head so that the modulated gray scale signal oscillates above and below the threshold level when the input signal is at a low voltage level.

According to a broader aspect of the present invention, the dot printer which is adapted to receive a gray scale input signal comprises a recording head having a tendency to become inoperative in a range below a threshold level, means for controlling the recording means in response to a clock pulse to record a dot with varying proportions of high and low discrete levels as a function of the gray scale input signal on a recording medium, means for moving the recording head and recording medium relatively to each other so that the recording head scans along a line path and is successively shifted to the next scan by the width of a line path, means for generating an oscillating signal, and means for modulating the amplitude of the gray scale input signal with the oscillating signal to overcome the tendency so that the modulated signal oscillates above and below the threshold level.

According to a first specific aspect of the present invention, the oscillating signal is a random signal of which the instantaneous value has a probability density function of its value and the maximum amplitude has a predetermined value with respect to the threshold level, whereby the modulated gray scale signal oscillates randomly above and below the threshold level. Preferably, the random signal is a bipolar signal of which the positive and negative instantaneous values have equal probability distributions. In a further preferred embodiment the polarity of the random signal is reversed at intervals equal to an integral multiple of the interval between successive clock pulses. The maximum amplitude of the random signal preferably ranges from 25% to 200% of the threshold level.

Prior to application to the recording head, the modulated gray scale signal is passed through a function generator having a transfer function including a step function with a transition which occurs when the gray scale input signal corresponds to one half of the threshold level.

According to a second specific aspect of the invention, the modulating means comprises a first and a second memory in which a set of first and second modulating data are respectively stored. The stored data are read as a function of the gray scale input signal in response to the clock pulse alternately out of the first and second memories in a given order and the order is reversed in response to each of the line paths being shifted to the next. The data read out of the memories are converted into a pulse having a corresponding amplitude and applied to the recording head. The gray scale input is thus oscillated between discrete levels which vary as a function of the gray scale input when the latter is relatively low, so that the resultant halftone image varies alternately in gray scale between high and low intensities along each line path. Preferably, means are provided to reverse the phase of the oscillating signal in response to the shifting of each line path to the next, producing a checkerboard-like pattern of low intensity level.

According to a third specific aspect of the invention, the dot printer comprises a dot matrix converter for converting the gray scale input signal into a series of dot-producing pulses to produce a dot or dots in a matrix to represent a picture element wherein the number of such dots in each matrix and the optical density of such dots are variable as a function of the gray scale input signal and wherein each dot-producing pulse occurs in response to the clock pulse. The clock pulse is generated at a frequency which is an integral multiple of the frequency at which the picture element occurs. The oscillating signal is generated at a frequency which is an integral submultiple of the frequency of the clock pulse.

Preferably, the dot matrix converter comprises a memory for storing therein a plurality of groups of storage cells, the storage cells in each group being arranged in a matrix of rows and columns, each of the storage cells storing modulating data representing the intensity of a dot to be recorded on the recording medium, and means for selecting one of the groups in response to the gray scale input signal. The modulating data is read out of the selected memory group row by row in response to the line path being shifted to the next and column by column in response to the clock pulse. The modulating data read out of the memory is converted into a voltage for application to the modulating means.

BRIEF DESCRIPTION OF THE DRAWINGS

The invention will be further described by way of example with reference to the accompanying drawings.

DETAILED DESCRIPTION

Figure 1:
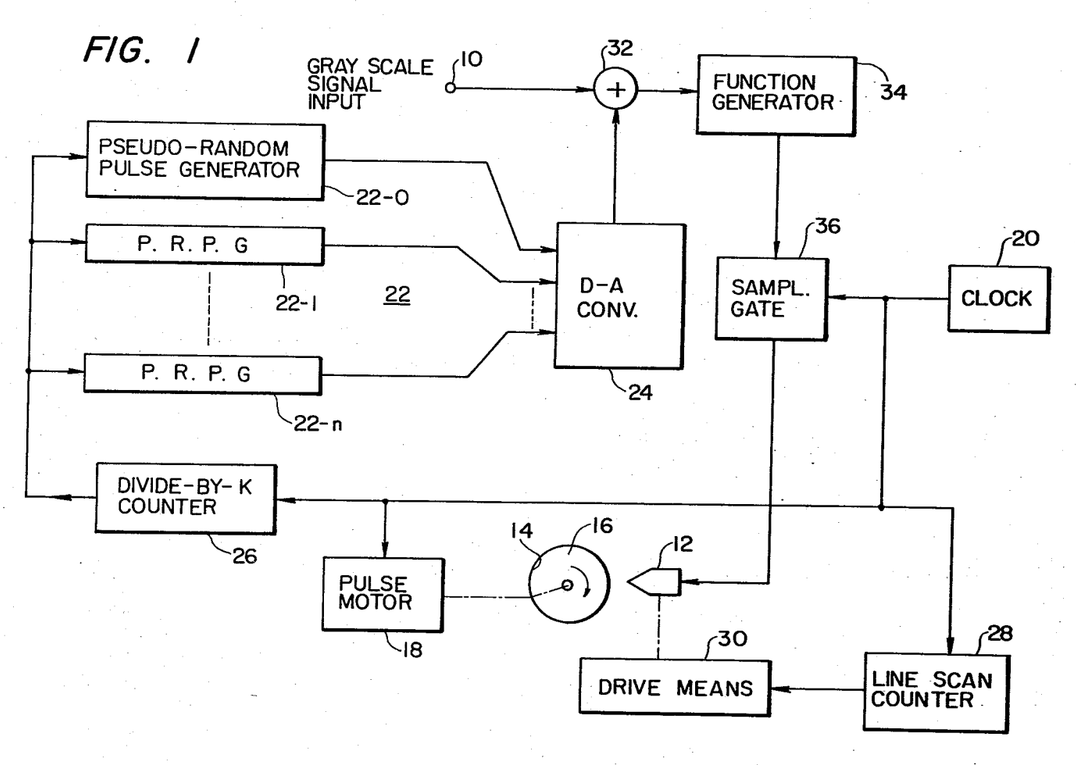
FIG. 1 is a schematic illustration of a dot printer according to a first preferred embodiment of the invention.

In FIG. 1 of the drawings, a dot printer according to a first preferred embodiment of the invention is schematically illustrated. The dot printer is adapted to receive a gray scale signal such as facsimile or any other video signals at an input terminal 10. The dot printer includes a recording head 12 of any suitable design such as ink jet or electrostatic printing head. A recording medium 14 is wrapped on a rotating drum 16 which is driven by a pulse motor 18 in response to a clock pulse supplied from a time base clock source 20 so that the recording head 12 scans along a line path which may comprise 2048 dots, for example, on the recording medium 14. Upon the application of a voltage to the recording head 12 a dot is produced on the recording medium in varying proportions of black and white to represent the optical density of a picture element of the original. A line scan counter 28 is connected to the clock source 20 to generate a line-shift command pulse upon the count of 2048 clock pulses, the line-shift command pulse being presented to a drive means 30 to allow the recording head 12 to shift to the next scanning line path when each line path is scanned to thereby produce a halftone image on the recording medium 14.

Figure 2:
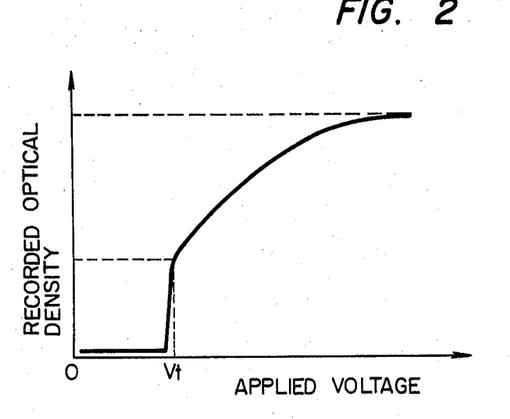
FIG. 2 is a graphic representation of the operating characteristic of the recording head of FIG. 1.

As shown in FIG. 2, due to its inherent characteristics the head 12 is not operable to produce dots when the applied voltage is below a threshold level Vt and as a result the halftone image is not a faithful replica of the original.

Figure 3A:
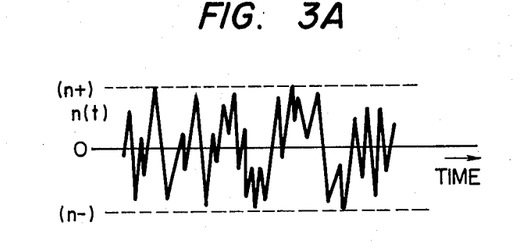
FIGS. 3A and 3B are graphic representations of the waveform and probability function of the modulating signal of the embodiment of FIG. 1, respectively.
Figure 3B:
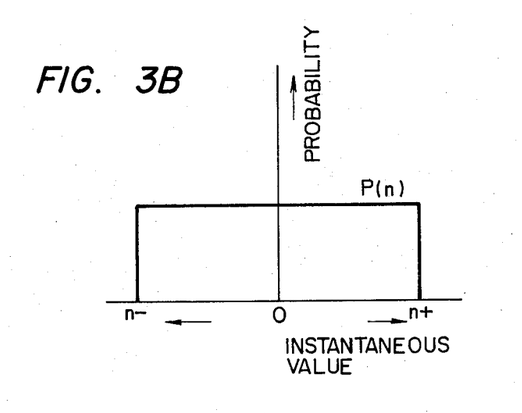

To extend the operating range of the recording head, the dot printer includes a random number generator designated generally at 22 and a digital-to-analog converter 24 which together constitute a modulating signal source. The random number generator 22 is formed by a plurality of pseudo-random pulse generators 22-0, 22-1 to 22-n having their inputs connected together to receive an output from a divide-by-K counter 26 which takes its input from the clock source 20. The pseudo-random pulse generators are thus incremented at a frequency which is an integral submultiple of the clock pulse frequency at which the dot is produced. The pseudo-random generator 22-0 generates a sign bit and the other pseudo-random generators 22-1 to 22-n generate #1 to #n data bits. The sign and data bits are applied to corresponding inputs of the digital-analog converter 24 for conversion into a bipolar voltage. The random number generator 22 is so designed that the instantaneous value n(t) of the bipolar random signal (shown in FIG. 3A) occurs as a probability density function of its value (FIG. 3B) and preferably has equal probability distributions P(n) throughout the range between the positive and negative peaks n+ and n− as seen in FIG. 3B, although other probability distributions such as Gaussian or Poisson distributions could also be employed.

The random voltage is applied to an adder 32 or modulating means which combines it with the gray scale input signal applied to terminal 10, the combined output being coupled to a function generator 34, whose function will be described below, and thence to a sampling gate 36 which samples the output of the function generator 34 in response to the clock pulse for application to the recording head 12. Responsively to each clock pulse, the recording head 12 is thus energized to a level corresponding to the gray scale input as modulated by the random signal.

Figure 4:
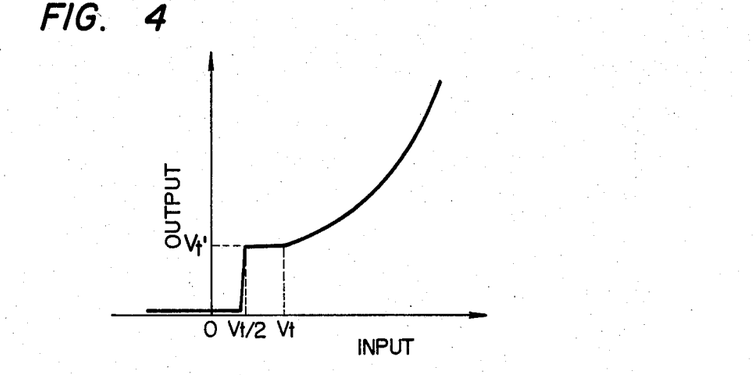
FIG. 4 is a graphic representation of the transfer function of the function generator of FIG. 1.
Figure 5A:
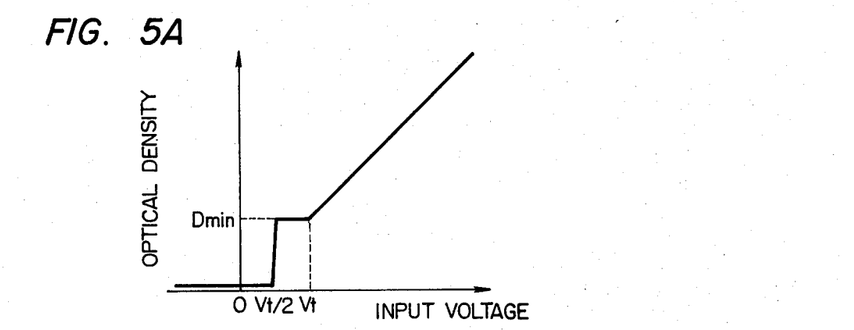
FIGS. 5A and 5B are graphic representations of the resultant operating characteristics of the recording head of FIG. 1.

As shown in FIG. 4, the function generator 34 is designed to have an input-output characteristic having a stepwise transition from zero to an optical density threshold Vt' (corresponding to the applied voltage threshold Vt) at a point one half the voltage threshold Vt. This characteristic also includes a curve which is complementary to the operating characteristic of the recording head 12 (FIG. 2) to compensate for the nonlinearity of the recording head 12 so that the net effect is a linear operating characteristic in a range above the threshold Vt as illustrated in FIG. 5A.

The principle of the embodiment of FIG. 1 is analyzed in quantitative terms as follows.

The expected value D of the recorded optical density corresponding to a given value "v" of gray scale input signal is expressed as follows:

$$\overline{D} = -\log_{10} \int_{v+(n-)}^{v+(n+)} 10^{-\delta(v)} dv \quad (1)$$

where δ represents the function describing the operating characteristic (FIG. 5A) of the recording head 12. If the amplitude $|n+|+|n-|$ of the random signal is small compared with the gray scale input v and if the gray scale input is large in comparison with a value $Vt+(n-)$, Equation 1 can be rewritten as follows:

$$\overline{D} = -\log_{10} \frac{10^{-\delta(v+n+)} + 10^{-\delta(v+n-)}}{2} \approx \quad (2)$$

$$D + (\tfrac{1}{2})\{\delta'(n+) + \delta'(n-)\}$$

where D is the actually produced optical density and represents a linear function from negative to positive similar to that shown in FIG. 5A with the exception that it has no step function. If $n+ = -n- = n$ is assumed, the expected optical density D is approximately equal to the reproduced optical density D when the gray scale input is greater than (Vt+n).

Figure 6:
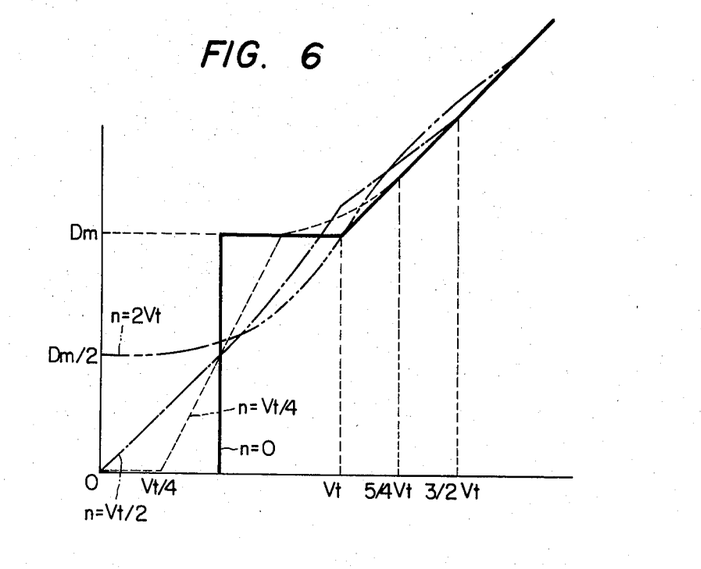
FIG. 6 is a graphic representation of the expected values of optical density as a function of gray scale input with the maximum amplitude of the modulating signal as a parameter.

The expected optical density of a gray scale input lower than (Vt+n) follows different curves depending on the parameter "n" as shown in FIG. 6. For example, with "n" being in a range from 0.25 times to 2 times the threshold Vt, the expected value takes on favorable optical densities. In particular, when n is 0.5 times the threshold Vt the expected value is substantially optimized, so that the details of the original halftone image can be reconstructed.

Figure 5B:
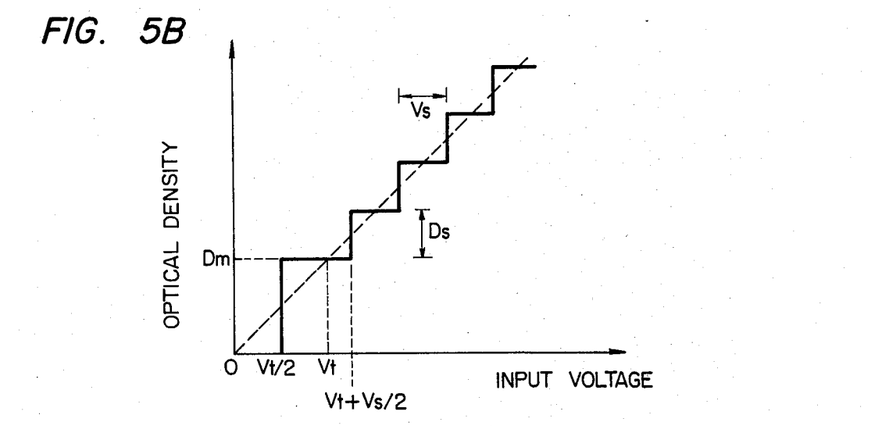

The function generator 34 could be modified so that the optical density of the recording head 12 varies discretely with an output increment of Ds as a function of an input increment of Vs in a range above the threshold level Vt as shown in FIG. 5B. The effect of this discrete function is to eliminate humps noted in the curves of FIG. 6 at a cost of correctable instabilities at the discrete steps.

Figure 7:
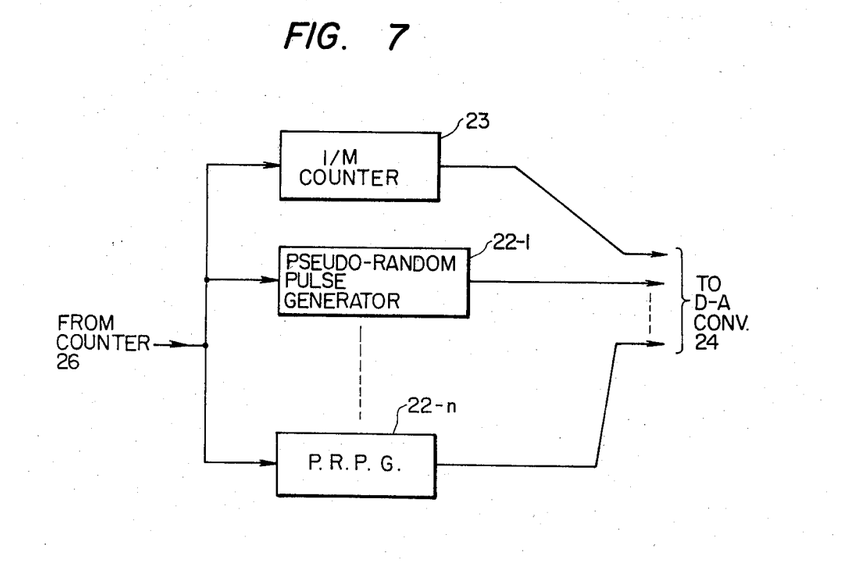
FIG. 7 is an illustration of a modification of the first embodiment.

The halftone image could be further improved by utilizing the fact that due to the subliminal characteristic of the human eye, it fails to perceive changes in low intensity which occur at regular intervals against the high-intensity information-bearing image. To this end, the embodiment of FIG. 1 is modified as shown in FIG. 7. In this modified form, the pseudo-random pulse generator 22-0 is replaced with a divide-by-M counter 23. The effect of this counter is to periodically reverse the polarity of the random signal at an integral multiple of the clock interval so that the low intensity image may vary at regular intervals.

Figure 8:
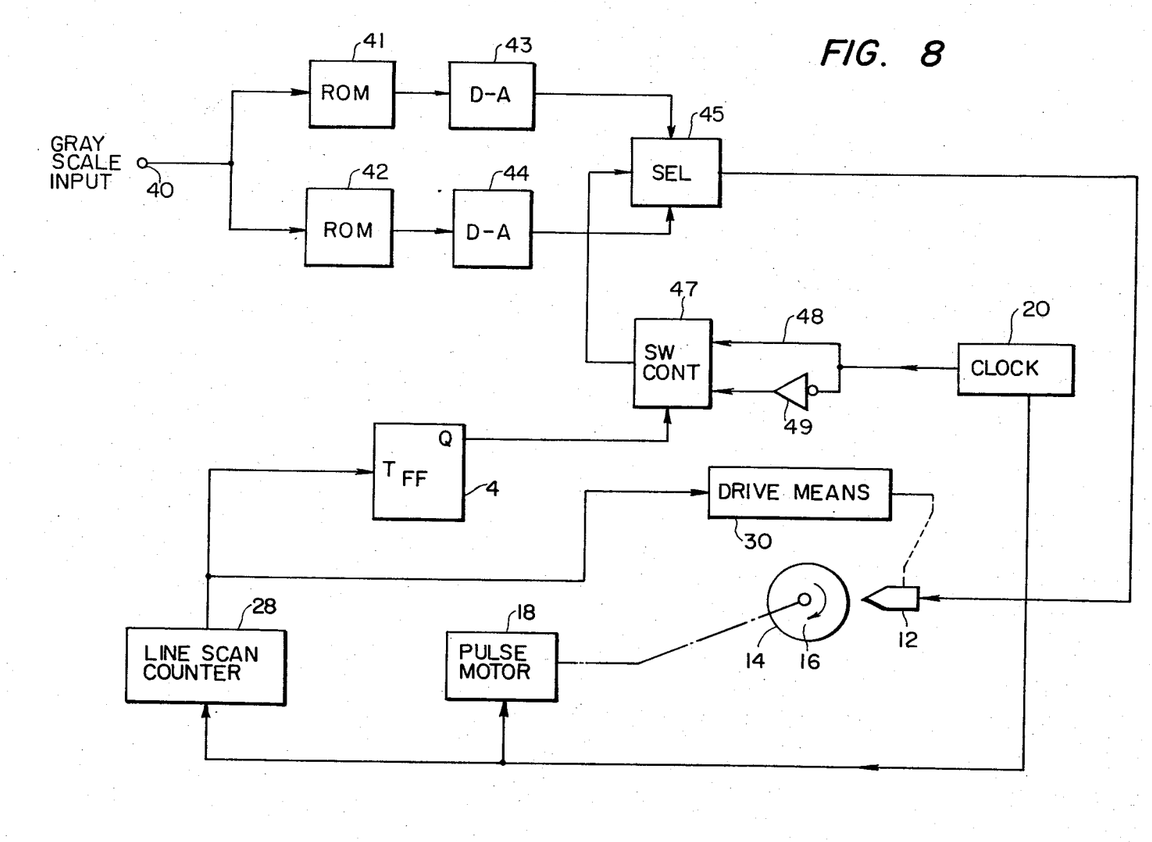
FIG. 8 is a schematic illustration of a dot printer according to a second preferred embodiment of the invention.

A second preferred embodiment of the invention is illustrated in FIG. 8 in which parts corresponding to those in FIG. 1 are marked with the same numbers used in FIG. 1. The dot printer of this embodiment comprises a pair of read only memories 41 and 42 having their inputs connected together to a gray scale input terminal 40 and a pair of digital-analog converters 43 and 44 connected to receive data read out of the ROM's 41 and 42, respectively. The outputs of the digital-analog converters 43, 44 are connected to a selector 45.

Figure 9:
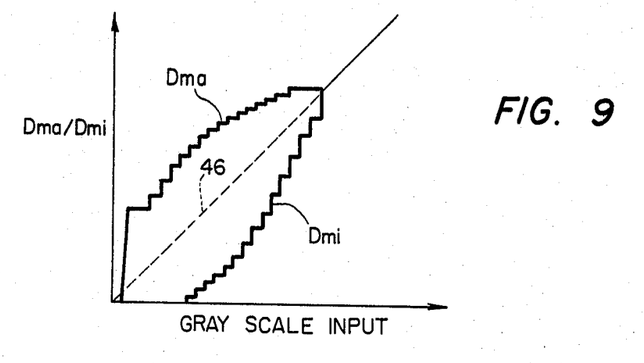
FIG. 9 is a graphic representation of the modulating data stored in the memories of FIG. 8.

In the ROM 41 is stored a set of digital oscillating data Dma for a gray scale input having an amplitude higher than the optimum line indicated at 46 in FIG. 9, and in the ROM 42 is stored another set of digital oscillating data Dmi for a gray scale signal having an amplitude lower than the optimum line. The ROM's 41 and 42 are read in response to the input gray scale signal to derive a pair of high and low digital data Dma and Dmi which vary as a function of the amplitude of the input gray scale signal. The data Dma and Dmi are fed into the digital-analog converters 43 and 44 respectively which convert the input data into corresponding analog voltages.

Figure 10:
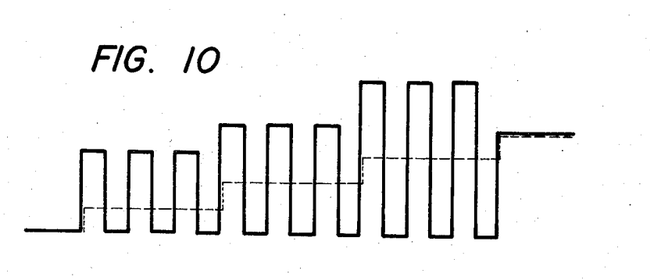
FIG. 10 is an illustration of the waveform of a modulated gray scale signal appearing in the embodiment of FIG. 8.
Figure 11:
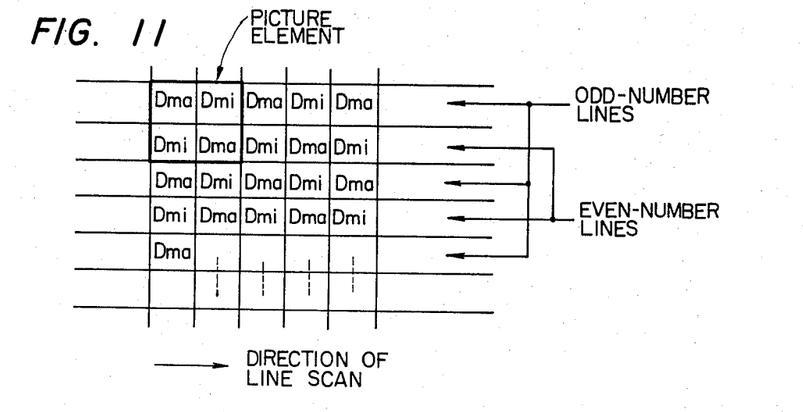
FIG. 11 is an illustration of a part of the resultant halftone image according to the second embodiment.

The clock source 20 supplies square wave clock pulses to an input of a switching control circuit 47 through a line 48 and to another input thereof through an inverter 49. The control circuit 47 is selectively enabled in response to an output from a T flip-flop 48 having its toggle input connected to receive a line-shift command pulse from the line scan counter 28 to supply the noninverted clock pulses to the selector 45 during a given line scan interval and supply the inverted ones during the next line scan period. The selector 45 alternately couples the input signals from converters 43 and 44 to the recording head 12 in a given order during each line scan and reverses the order during the next line scan. As a result, the recording head 12 is driven by an oscillating gray scale signal shown in FIG. 10 when the gray scale input, indicated by broken lines, is of relatively low voltage level. The optical densities corresponding to digital values Dma and Dmi are produced on the recording medium in alternate succession and the order of occurrence is reversed in response to the scanned line path being shifted to the next, as shown in FIG. 11. Since each clock corresponds to a picture element in the reproduced halftone image, a set of high and low oscillating voltages is generated for each clock, whereby each picture element is defined by four dots as marked within a thick-line rectangle in FIG. 11.

The digital values stored in the read only memories 41 and 42 are determined so that the average value of the optical densities thus obtained over a plurality of picture elements equals the average value of the gray scale input which occurs during the period corresponding to these picture elements.

The reproduced halftone image thus bears a low intensity regular pattern which is somewhat like a closely spaced apart checkerboard pattern. This embodiment is particularly suitable for improving the details of hightlights.

Figure 12:
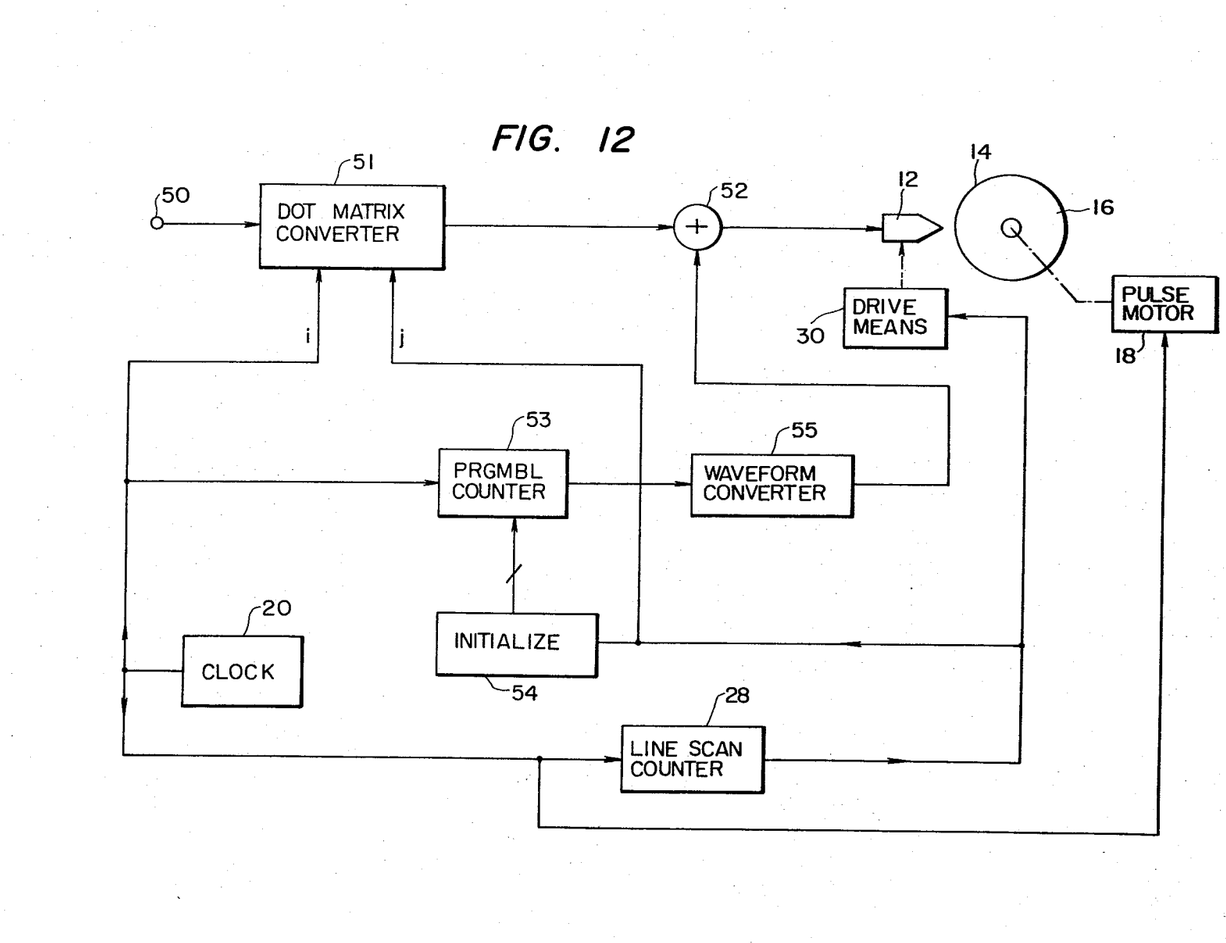
FIG. 12 is a schematic illustration of a dot printer according to a third preferred embodiment of the invention.

FIG. 12 is an illustration of a third preferred embodiment of the invention. This embodiment is characterized by the inclusion of a dot matrix converter 51 which converts the gray scale input at terminal 50 into one or more dots of varying proportions of black and white. The dot matrix converter 51 essentially comprises a plurality of memories in the form of map or look-up tables in which a set of digital data is stored in specified cell locations. The matrix converter 51 receives "i" clock pulses from the time base clock source 20 and "j" clock pulses from the line scan counter 28 to deliver a dot indicating pulse of varying height to an adder 52 in a manner as will be described in detail later.

The "i" clock pulse is also supplied to a presettable or programmable counter 53 of conventional design. The programmable counter 53 is initialized or reset by an initializing circuit 54, connected to the line scan counter 28, at the termination of each line scan to a count value which is specifically predetermined for each scan line. Therefore, the output of the programmable counter 53 occurs at periodic intervals which vary in response to each line path. The output of the counter 53 is fed to a waveform converter 55 which converts the pulsating waveform of its input into a continuously varying waveform. A sinusoidal waveform is a typical example for this purpose. The frequency of the output of the converter 55 is lower than the frequency of the time base clock "i" and varies for different line paths. The converter 55 supplies its output to the adder 52 to modulate the dot indicating pulse.

Figure 13:
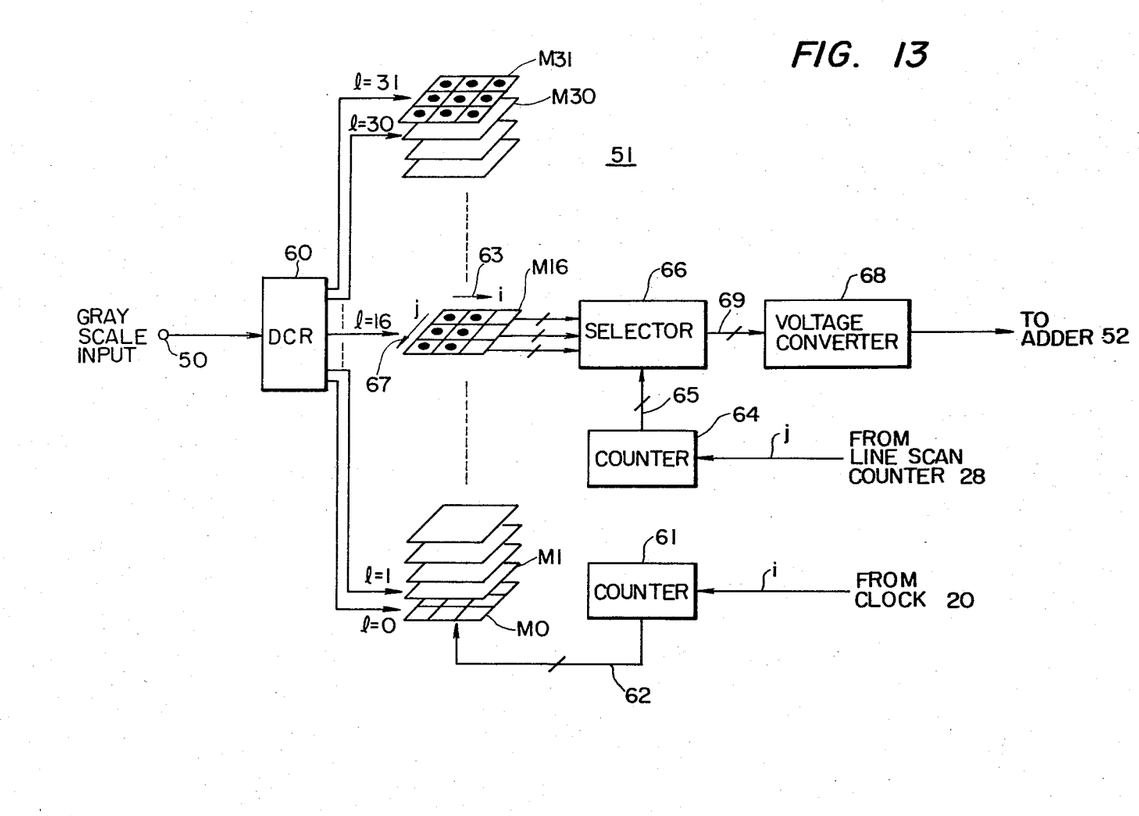
FIG. 13 is an illustration of the detail of the dot matrix converter of FIG. 12.
Figure 14:
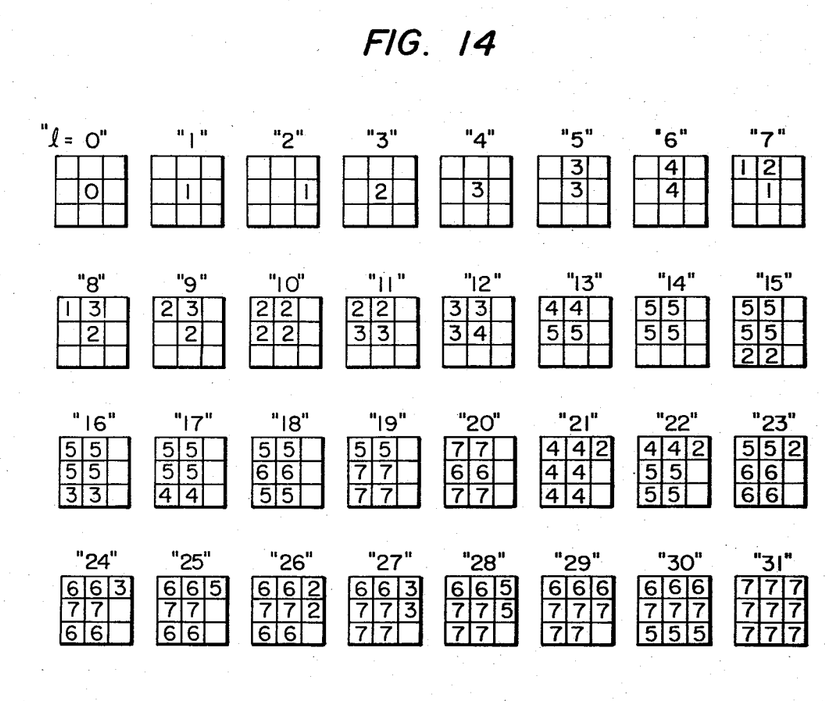
FIG. 14 is an illustration of the dot matrices of the table memories of FIG. 13.

Details of the dot matrix converter 51 are illustrated in FIG. 13. The dot matrix converter 51 comprises a decoder 60 connected to the input terminal 50 and a plurality of table memories M0 to M31. The decoder 60 converts the gray scale input into a memory select signal for selecting one of the table memories M0 to M31 according to the amplitude of the gray scale input. In the illustrated embodiment each memory is made up of storage cells arranged in a pattern of three rows and three columns and each cell corresponds to each dot to be recorded. The storage cells are loaded with 3-bit data, as indicated by decimal numbers in FIG. 14, to represent the optical density or size of the dot in discrete steps ranging from 0 to 7.

Further included is a counter 61 which receives the "i" clock pulse from the clock source 20 to decode it into a binary number represented by two-bit lines 62 which are connected together to the table memories M0 to M31 to read out the cells column by column as indicated by an arrow 63.

A counter 64 is connected to the line scan counter 28 to decode the "j" clock into a binary number which is supplied through two-bit lines 65 to a selector 66 to read the cells row by row, as indicated by an arrow 67, out of the memory selected by the decoder 60. Since the "i" and "j" are synchronized with the timing of dot and line scan respectively, the cells in the selected table memory are read out in the direction of row and fed to a voltage converter 68 and thence to the adder 52. This process is repeated during subsequent line scans so that all the cells of the selected memory have been unloaded to the selector 66. Therefore, the decoder 60 retains its memory select signals until "three" line paths have been scanned. As a result each picture element is represented by 3×3 dots.

The voltage converter 68 receives the output of the selector 66 through three-bit lines 69 to convert the binary data read out of the selected memory into a voltage amplitude with a transfer function that describes the relationship between the input-output characteristic of the recording head 12 to correct its nonlinear characteristic.

Figure 15A:
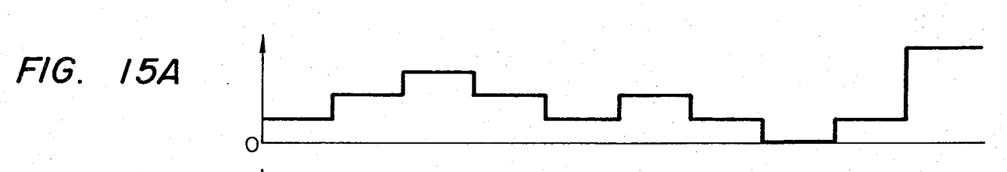
FIGS. 15A to 15D are illustrations of waveforms associated with the embodiment of FIG. 12.
Figure 15B:
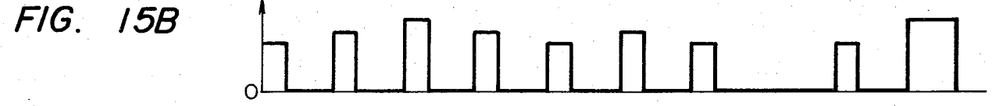
Figure 15C:
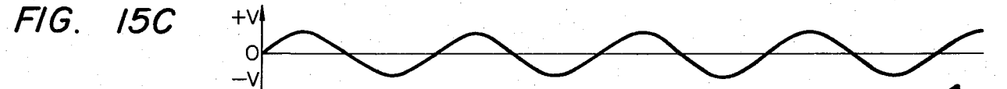
Figure 15D:
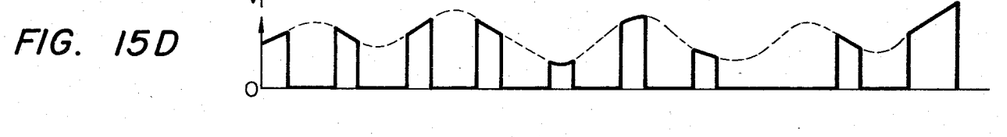

FIGS. 15A to 15D illustrate waveforms which appear in the circuit of FIG. 12 during a line scan period. FIG. 15A represents the waveform of the gray scale input which is schematically indicated in discrete values for clarity and retained for a period of three line paths in the decoder 60 or an external line memory, not shown. FIG. 15B shows the output of the selector 66 which occurs during that line scan period. As is seen from FIGS. 15A and 15B, a maximum of three dot-producing pulses of varying height is generated for a given gray scale level. The modulating signal supplied to the adder 52 is shown in FIG. 15C as a sinusoidal wave of a frequency which is an integral submultiple of the frequency of the "i" clock, the integral submultiple being determined by the initializing circuit 54 as mentioned above. The amplitude modulated dot producing pulses are represented in FIG. 15D.

Figure 16:
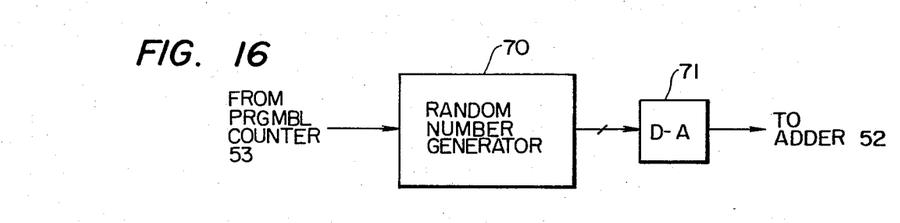
FIG. 16 is an illustration of a modification of the embodiment of FIG. 12.

Instead of the waveform converter 55 of FIG. 12 a random number generator 70 and a digital-analog converter 71, shown in FIG. 16 may also be employed. In this modified embodiment, the random number generator 70 generates a plurality of randomly occurring pulses in a manner as previously described in connection with the first embodiment of the invention and the digital-analog converter 71 translates the pulses into a random voltage for application to the adder 52.

What is claimed is:

1. A dot printer adapted to receive a gray scale input signal comprising a recording head having a tendency to become inoperative in a range below a threshold level, means for controlling said recording means in response to a clock pulse to record on a recording medium a dot with varying proportions of high and low discrete levels as a function of said gray scale input signal, means for moving said recording head and recording medium relatively to each other so that the recording head scans along a line path and is successively shifted to the next scan line by the width of a line path, means for generating an oscillating signal, and means for modulating the amplitude of said gray scale input signal with said oscillating signal to overcome said tendency so that the modulated signal oscillates above and below the threshold level.

2. A dot printer adapted to receive a gray scale input signal comprising a recording head having a tendency to become inoperative in a range below a threshold level, means for controlling said recording head in response to a clock pulse to record a dot with varying proportions of high and low discrete levels as a function of said gray scale input signal on a recording medium, means for relatively moving said recording head and recording medium to each other so that the recording head scans along a line path and is successively shifted to the next by the width of a line path, means for generating a random signal of which the instantaneous value has a probability density function of its value and the maximum amplitude has a predetermined value with respect to said threshold level, and means for modulating the amplitude of said gray scale input signal with said random signal so that the modulated signal oscillates randomly above and below said threshold level.

3. A dot printer as claimed in claim 2, wherein said modulating means comprises:
   a first and a second memory in which a set of first and second modulating data are respectively stored;
   means for reading a corresponding datum as a function of the gray scale input signal in response to said clock pulse alternately out of said first and second memories in a given order and reversing said order in response to each said line path being shifted to the next; and
   means for converting the datum read out of said memories into a pulse of an amplitude which is a function of said datum for application to said recording head.

4. A dot printer as claimed in claim 2, wherein said random signal is a bipolar signal of which the positive and negative instantaneous values have equal probability distributions.

5. A dot printer as claimed in claim 2, further comprising means for reversing the polarity of said random signal at an interval which is an integral multiple of the interval between successive ones of said clock pulses.

6. A dot printer as claimed in any one of claims 4 or 5 wherein said maximum amplitude of the random signal ranges from 0.25 times to 2 times as much as said threshold level.

7. A dot printer as claimed in any one of claims 2, 3 or 4, further comprising a function generator connected to the output of said modulating means and having a transfer function including a step function having a transition occurring when said gray scale input signal corresponds to one half of said threshold level, the output of said function generator being applied to said recording head.

8. A dot printer as claimed in claim 7, wherein a portion of said transfer function is complementary to the operating characteristic of said recording head.

9. A dot printer as claimed in claim 2, further comprising a dot matrix converter for converting said gray scale input signal into a series of dot-producing pulses in response to said clock pulse to produce a dot or dots in a matrix to represent a picture element when applied to said recording head wherein the number of such dots in each matrix and the optical density of each dot are variable as a function of said gray scale input signal, wherein said oscillating signal generating means includes means for generating a second oscillating signal at a frequency which is an integral submultiple of the frequency of said clock pulse.

10. A dot printer as claimed in claim 9, further comprising means for shifting the phase of said oscillating signal by a predetermined amount in response to said line path being shifted each time to the next.

11. A dot printer as claimed in claim 10, wherein said phase shift is 180 degrees.

12. A dot printer as claimed in claim 9 or 10, wherein said oscillating signal is a sinusoidal signal.

13. A dot printer as claimed in claim 9 or 10, wherein said oscillating signal is a triangular wave signal.

14. A dot printer as claimed in claim 9 or 10, wherein said oscillating signal is a random signal.

15. A dot printer as claimed in claim 9, wherein said dot matrix converter comprises:
 a memory for storing therein a plurality of groups of storage cells, the storage cells in each group being arranged in a matrix of rows and columns, each of said storage cells storing modulating data representing the intensity of a dot to be recorded on said recording medium;
 means for selecting one of said groups in response to said gray scale input signal;
 means for reading the modulating data out of said selected group row by row in response to said line path being shifted to the next and column by column in response to said clock pulse; and
 means for converting said read-out modulating data into a voltage for application to said modulating means.

16. A dot printer as claimed in claim 15, wherein said converting means has a transfer function describing the operating characteristic of said recording head to transfer said modulating data according to said operating characterstic.

17. A dot printer as claimed in claim 15 or 16, wherein said oscillating signal generating means comprises:
 a presettable counter arranged to be incremented at the integral submultiple of the frequency of said clock pulse;
 means for initializing the preset value of said presettable counter in response to said line path being shifted to the next; and
 means for converting the output of said counter into an oscillating voltage for application to said modulating means.

18. A dot printer as claimed in claim 17, wherein said means for converting the output of the counter comprises a random number generator for generating a plurality of binary digits representing a random number in response to the occurrence of an output from said presettable counter and a digital-to-analog converter having an input connected to the output of said random number generator and an output connected to said modulating means.

19. In a dot printer adapted to receive a gray scale input signal and including a recording head inoperative for signals having an amplitude lower than a threshold level,
 a threshold extending control apparatus for said recording head operative to cause said recording head to print dots of varying density levels for gray scale input signals having an amplitude lower than said threshold level, comprising:
 modulating means receiving said gray scale input signals and connected to said recording head for modulating the gray scale input signal and for providing to said recording head a modulated input signal varying above and below the threshold level for values of said gray scale input signal lower than said threshold value, and
 generating means connected to said modulating means for generating a varying signal and providing said varying signal to said modulating means for modulation of said gray scale input signal.

20. A dot printer as recited in claim 19, wherein said generating means comprises oscillating means for generating bipolar signals.

21. A dot printer as recited in claim 20, wherein said oscillating means comprises random signal generating means for generating random signals having an instantaneous amplitude and polarity each determined in accordance with a known probability density function, the maximum amplitude of said random signals having a predetermined relationship with respect to said threshold level,
 whereby said modulated signal varies randomly above and below said threshold level.

* * * * *

UNITED STATES PATENT OFFICE
CERTIFICATE OF CORRECTION

PATENT NO. : 4,394,662
DATED : July 19, 1983
INVENTOR(S) : Kunio Yoshida et al.

It is certified that error appears in the above-identified patent and that said Letters Patent are hereby corrected as shown below:

Column 4, line 14, "as" should be --with--;
         line 14, "of its value" should be --(shown in--
         line 15, "(Fig. 3B) and preferably has" should be --Fig. 3B) preferably having--.

Signed and Sealed this

Third Day of January 1984

[SEAL]

Attest:

GERALD J. MOSSINGHOFF

Attesting Officer     Commissioner of Patents and Trademarks